US010055874B2

(12) United States Patent
Yu et al.

(10) Patent No.: US 10,055,874 B2
(45) Date of Patent: *Aug. 21, 2018

(54) LIP SYNCHRONIZATION BETWEEN RIGS

(71) Applicant: LUCASFILM ENTERTAINMENT COMPANY LTD., San Francisco, CA (US)

(72) Inventors: Ji Hun Yu, Foster City, CA (US); Michael Koperwas, San Francisco, CA (US); Jeffrey Bruce Yost, San Francisco, CA (US); Sheila Santos, San Francisco, CA (US); Kiran S. Bhat, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 14/831,021

(22) Filed: Aug. 20, 2015

(65) Prior Publication Data
US 2017/0053663 A1    Feb. 23, 2017

(51) Int. Cl.
*G10L 21/10* (2013.01)
*G06T 13/40* (2011.01)
*G06T 13/20* (2011.01)

(52) U.S. Cl.
CPC ................................. *G06T 13/40* (2013.01)

(58) Field of Classification Search
CPC ......... G06T 19/00; G06T 17/20; G06T 17/00; G06T 15/10; G06T 15/00; G06T 13/40;
(Continued)

(56) References Cited

U.S. PATENT DOCUMENTS 6,307,576 B1    10/2001  Rosenfeld
7,433,490 B2    10/2008  Huang et al.
(Continued)

OTHER PUBLICATIONS

Bhat, Kiran et al., "High Fidelity Facial Animation Capture and Retargeting With Contours", SCA 2013, Jul. 19-21, 2013, Anaheim, California, pp. 7-14.
(Continued)

*Primary Examiner* — Todd Buttram
(74) *Attorney, Agent, or Firm* — Kilpatrick Townsend & Stockton LLP

(57) ABSTRACT

In some embodiments a method of transferring facial expressions from a subject to a computer-generated character is provided where the method includes receiving positional information from a motion capture session of the subject representing a performance having facial expressions to be transferred to the computer-generated character, receiving a first animation model that represents the subject, and receiving a second animation model that represents the computer-generated character. Each of the first and second animation models can include a plurality of adjustable controls that define geometries of the model and that can be adjusted to present different facial expressions on the model, and where the first and second animation models are designed so that setting the same values for the same set of adjustable controls in each model generates a similar facial poses on the models. The method further includes determining a solution, including values for at least some of the plurality of controls, that matches the first animation model to the positional information to reproduce the facial expressions from the performance to the first animation model, retargeting the facial expressions from the performance to the second animation model using the solution; and thereafter, synchronizing lip movement of the second animation model with lip movement from the first animation model.

20 Claims, 10 Drawing Sheets

(58) Field of Classification Search
CPC ......... G06T 13/00; G06T 13/80; G06T 13/20; A63F 13/10; A63F 2300/6607
See application file for complete search history.

(56) References Cited

U.S. PATENT DOCUMENTS

| | | |
|---|---|---|
| 8,035,643 B2 | 10/2011 | Pighin et al. |
| 9,600,742 B2* | 3/2017 | Bhat .................... G06K 9/6201 |
| 2002/0101422 A1* | 8/2002 | Rosenfeld ............ G06T 13/205 345/473 |
| 2017/0046865 A1* | 2/2017 | Cantwell ................ G06T 13/40 |

OTHER PUBLICATIONS

Bhat, Kiran et al., U.S. Appl. No. 13/168,389, filed Jun. 24, 2011, entitled "Refining Facial Animation Models", 29 pages (Unpublished.).

Bhat, Kiran et al., U.S. Appl. No. 13/361,350, filed Jan. 30, 2012 entitled "Facial Animation Models", 34 pages (Unpublished.).

Mallet, Ronald et al., U.S. Appl. No. 13/839,243, filed Mar. 15, 2013 entitled "Facial Animation Models", 36 pages (Unpublished.).

Bhat, Kiran et al., U.S. Appl. No. 14/704,796, filed May 5, 2015, entitled "Determining Control Values of an Animation Model Using Performance Capture", 52 pages (Unpublished.).

* cited by examiner

LIP SYNCHRONIZATION BETWEEN RIGS

BACKGROUND OF THE INVENTION

The present disclosure relates generally to performance capture, and more specifically to methods and techniques and systems for transferring facial expressions from an actor to a computer-generated character.

Facial expression transfer is the act of adapting the facial expressions of an actor to a computer-generated (CG) target character. The expression transfer process plays an important role in transferring subtle facial expressions of the actor to the CG character giving the CG character natural, life-like expressions. Accurately transferring the nuances of an actor's facial expressions, including accurately transferring lip movement, to the CG character can be a complex and difficult process. Embodiments of the invention address these and other problems both individually and collectively.

BRIEF SUMMARY OF THE INVENTION

Techniques for transferring facial expressions from an actor to a computer-generated (CG) character are provided herein. One or more embodiments described herein include techniques for accurately transferring lip and jaw movements of an actor (sometimes referred to herein as a "subject") to a CG character to produce believable, robust, and editable animations in an automated manner. In some examples, one or more techniques may be provided for improving the synchronization of lip and jaw movements of a CG character to the lip and jaw movements of the subject.

Some embodiments provide a method of transferring facial expressions from a subject to a computer-generated character. The method includes receiving positional information from a motion capture session of the subject representing a performance in which the facial expressions of the subject are to be transferred to the computer-generated character. First and second animation models are also received where the first animation represents the subject and the second animation model represents the computer-generated character. Each of the first and second animation models can include a plurality of adjustable controls that define geometries of the model and that can be adjusted to present different facial expressions on the model, and the first and second animation models can be designed so that setting the same values for the same set of adjustable controls in each model generates a similar facial poses on the models. The method further includes determining a solution, including values for at least some of the plurality of controls, that matches the first animation model to the positional information to reproduce the facial expressions from the performance to the first animation model, retargeting the facial expressions from the performance to the second animation model using the solution; and thereafter, synchronizing lip movement of the second animation model with lip movement from the first animation model. In some embodiments each of the first animation model and the second animation model includes a three-dimensional deformable numerical mesh and the adjustable controls for each animation model defines geometries of its mesh.

In some embodiments synchronizing lip movement of the second animation model with lip movement from the first animation model includes determining a visible percentage of teeth for the first animation model; determining a visible percentage of teeth for the second animation model; and determining if the visible percentage of teeth for the second animation model matches the visible percentage of teeth for the first animation model, and if not, adjusting the visible percentage of teeth in the second animation model to more closely match the percentage in the first animation model. A match between the visible percentage of teeth for the second animation model and the visible percentage of teeth for the first animation model can occur when the percentages are within a predetermined amount of each other, and in some instances, adjusting the visible percentage of teeth in the second animation model to more closely match the percentage in the first animation model can include moving either or both upper and lower lip shapes of the second animation model.

In some embodiments where lip shapes are moved to adjust the visible percentage of teeth in the second animation model, the lip shapes can be moved according to a binary search algorithm, and the sequence of: (i) determining a visible percentage of teeth for the second animation model, and (ii) determining if the visible percentage of teeth for the second animation model matches the visible percentage of teeth for the first animation model, and if not, adjusting the visible can be percentage of teeth in the second animation model to more closely match the percentage in the first animation model can be repeated until the visible percentages match.

In some embodiments, determining a visible percentage of teeth for the first animation model includes: (i) determining an occluding contour of both the upper or lower lips of the first animation model, (ii) determining a distance between a root and a tip for each of the upper and lower teeth of the first animation model, (iii) computing an intersection between the occluding contour and the tooth lines of the upper and lower teeth of the first animation model, and (iv) calculating a percentage of visible upper teeth and a percentage of visible lower teeth for the first animation model; and determining a visible percentage of teeth for the second animation model includes: (i) determining an occluding contour of both the upper or lower lips of the second animation model, (ii) determining a distance between a root and a tip for each of the upper and lower teeth of the second animation model, (iii) computing an intersection between the occluding contour and the tooth lines of the upper and lower teeth of the second animation model, and (iv) calculating a percentage of visible upper teeth and a percentage of visible lower teeth for the second animation model.

In some embodiments, synchronizing lip movement of the second animation model with lip movement from the first animation model includes determining a jaw opening of the first animation model; determining a jaw opening for the second animation model; and determining if the jaw opening of the second animation model matches the jaw opening of the first animation model, and if not, adjusting the jaw opening of the second animation model to more closely match the jaw opening of the first animation model. Adjusting the jaw opening of the second animation model to more closely match the jaw opening of the first animation model can include raising or lowering the lower jaw. In some instances, determining a jaw opening for each of the actor and second animation models includes: determining a distance between roots of upper and lower teeth of the respective rig; determining a distance between tips of upper and lower teeth of the respective rig; and computing a ratio of the distance between the roots of the upper and lower teeth and the distance between the tips of the upper and lower teeth. And, in some embodiments, determining if the jaw opening of the second animation model matches the jaw opening of the first animation model is performed only if the jaw opening of the second animation model is less than a predetermined amount.

In some embodiments the jaw opening is adjusted according to a binary search algorithm in which a sequence of: (i) determining a jaw opening of the second animation model, and (ii) determining if the jaw opening of the second animation model matches the jaw opening of the first animation model, and if not, adjusting the jaw opening of the second animation model to more closely match the jaw opening of the first animation model, is repeated until the jaw openings match.

In some embodiments, synchronizing lip movement of the second animation model with lip movement from the first animation model includes determining a jaw opening of the first animation model, determining a jaw opening for the second animation model, and determining if the jaw opening of the second animation model matches the jaw opening of the first animation model, and if not, adjusting the jaw opening of the second animation model to more closely match the jaw opening of the first animation model; and thereafter, determining a visible percentage of teeth for the first animation model, determining a visible percentage of teeth for the second animation model, and determining if the visible percentage of teeth for the second animation model matches the visible percentage of teeth for the first animation model, and if not, adjusting the visible percentage of teeth in the second animation model to more closely match the percentage in the first animation model.

In certain embodiments a system for transferring facial expressions from a subject to a computer-generated character is provided. The system can include a memory storing a plurality of instructions; and one or more processors configurable to: (i) receive positional information from a motion capture session of the subject representing a performance having facial expressions to be transferred to the computer-generated character; (ii) receive a first animation model that represents the subject and a second animation model that represents the computer-generated character, each of the first and second animation models including a plurality of adjustable controls that define geometries of the model and that can be adjusted to present different facial expressions on the model, wherein the first and second animation models are designed so that setting the same values for the same set of adjustable controls in each model generates a similar facial poses on the models; (iii) determine a solution that matches the first animation model to the positional information to reproduce the facial expressions from the performance to the first animation model, the solution including values for at least some of the plurality of controls; (iv) retarget the facial expressions from the performance to the second animation model using the solution; and (v) thereafter, synchronize lip movement of the second animation model with lip movement from the first animation model.

In certain embodiments a non-transitory computer-readable memory storing a plurality of instructions executable by one or more processors for transferring facial expressions from a subject to a computer-generated character is provided. The plurality of instructions can include instructions that cause the one or more processors to receive positional information from a motion capture session of the subject representing a performance having facial expressions to be transferred to the computer-generated character; instructions that cause the one or more processors to receive an animation model that represents the subject, the animation model including a plurality of adjustable controls that define geometries of the animation model and that can be adjusted to represent different facial expressions for the animation model; instructions that cause the one or more processors to determine a solution that matches the animation model to the positional information to reproduce the facial expressions from the performance to an first animation model that represents the subject using the positional information and animation model, the solution including values for at least some of the plurality of controls; instructions that cause the one or more processors to retarget the facial expressions from the performance to the second animation model using the solution; and instructions that cause the one or more processors to synchronize lip movement of the creature with lip movement from the first animation model after the facial expressions are retargeted from the performance to the second animation model.

The foregoing, together with other features and embodiments, will be described in more detail below in the following specification, claims, and accompanying drawings.

BRIEF DESCRIPTION OF THE DRAWINGS

Illustrative embodiments of the present invention are described in detail below with reference to the following drawing figures.

DETAILED DESCRIPTION OF THE INVENTION

Multimedia productions, such as movies, television shows, and games, oftentimes include computer-generated or digital characters. These characters may include humans, fictional characters or creatures, or other characters. A common goal in the animation industry is to render realistic and believable animations that capture the detailed, nuanced features of the subject or actor playing the digital character. The face of the subject includes numerous subtleties as the subject performs different poses and/or talks or converses with other characters. Viewers of content may rely heavily on the movement of a character's lips and jaw when interpreting character dialogue. Therefore, transferring a detailed and accurate representation of the subject's facial features during a performance, including the subject's lip and jaw movements, can be important in creating a realistic animation of the subject.

One or more embodiments described herein include techniques for accurately transferring lip and jaw movements of an actor to a CG character (e.g., a CG animated character associated with an offline application, such as a motion picture, or an online application, such as a video game) to produce believable, robust, and editable animations in an automated manner. In some examples, one or more techniques may be provided for synchronizing lip and jaw movements of a subject with a corresponding CG character. For example, images of facial expressions of the subject may be captured by one or more cameras, optical scanners, or other image capture devices. Input data (e.g., position information defining positions on the subject, contour information defining contour features of the subject, or other suitable input data) corresponding to one or more poses performed by the subject may be computed from the images, and may be processed to generate an animation model that mathematically defines the shape and motion of the underlying asset, such as a computer-generated representation of the subject. The animation model may include an adjustable three-dimensional numerical mesh. Once generated, the animation model can be used to track the subject during a performance and produce realistic representations of the captured facial expressions of the subject. The animation model may also be used to track and transfer the facial performance of the subject to an animated character in a process referred to as re-targeting.

Figure 1:
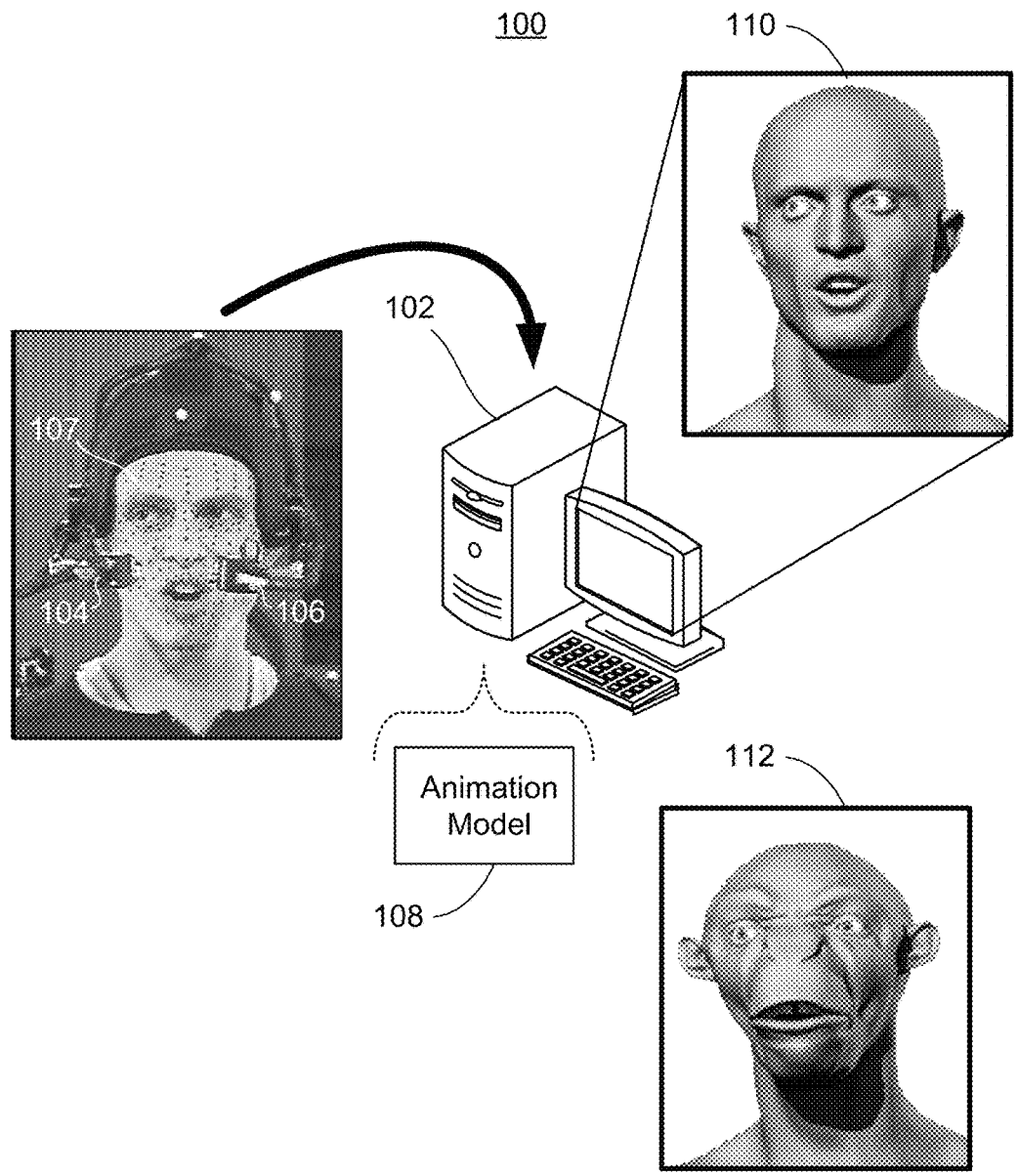
FIG. 1 is a block diagram of an animation system with which the facial performance of a subject can be captured and re-targeted to an animated character according to some embodiments of the invention.

FIG. 1 is a block diagram of an animation system 100 with which the facial performance of a subject can be re-targeted to an animated character according to embodiments of the invention. Animation system 100 can capture facial expressions of a subject and use the captured information to efficiently produce an animation model that is capable of accurately representing the captured expressions (along with other expressions). Animation system 100 includes a computer system 102 in communication with one or more image capture devices, such as a head-mounted pair of cameras 104, 106, that may capture images of the subject's face during an image capture process.

In some embodiments, an image capture setup may be implemented in which a relatively sparse set of features associated with the subject's face is used for attaining position information (e.g., represented in a rectangular coordinate system). In some examples, the features of the subject's face may be highlighted artificially. For example, positions on a subject's face may be obtained using markers attached to the position locations on the face, fluorescent paint applied to the position locations on the face, or the like. In some examples, the features may include natural facial features, such as wrinkles located in the corner of an eye, the ridge of a subject's nose, or other natural features. Combinations of artificial and natural facial features may also be obtained from the images. The features may be captured at different camera views or perspectives and may be captured using multiple image capture devices (e.g., head-mounted cameras 104, 106). Once obtained, the position information may be used for constructing an animation model 108 of the subject's face that, may in turn, be used in the process of transferring a facial expression from an actor to a CG character as described below.

In the example illustrated in FIG. 1, a sparse set of artificial markers 107 have been applied to the subject to highlight facial features. For example, the artificial markers are adhered in a pattern across the subject's face. In some embodiments, computing system 102 may compute the position information using the markers in the captured images (e.g., a two-dimensional point in screen space, a three-dimensional point using triangulation or trilateration, or other suitable location determination technique).

In some instances, the sparse set of markers may be unable to provide sufficient detail to allow computing system 102 to reconstruct the small nuances expressed by the subject, such as when the subject performs a pose or expression with a subtle emotion. For example, areas around the eyelids and the mouth are often found to be problematic in animation due to frequent self-occlusions seen from the camera. Animation system 100 is able to capture such nuances by also using contour information. The contour information can be associated with silhouette contours representing moveable boundaries of the subject's skin. Examples of such contours include the subject's eyelids, the subject's inner mouth or lip, the subject's nostrils, or other places on the subject's face where the skin of the face separates from another part of the face. Other contours may include less dramatic contours, such as the outer mouth or lip, the eyebrow line, the nasal labial fold, the nostril lines, or the like. Computing system 102 may compute the contour information based on contours detected in the captured images (e.g., using occluding edge computations and matching techniques). Effectively using one or more of the contours when tracking the subject's performance, in addition to sparse set of markers 107, may enable animation model 108 to more effectively match the actual shape and motion of the subject's facial features during a performance, such as the lips during a dialogue and replicating eye blinks throughout the performance.

The animation model 108 produced from the position information and/or the contour information may include various components. For example, animation model 108 may implement a collection of deformable geometries that correspond to various shapes of the subject's face. In one example, the shapes may be patterned after human facial muscles. The shapes may also be referred to as blendshapes. The shapes may have geometries that can be controlled, adjusted, deformed, or weighted, alone or in combination with other shapes, so animation model 108 is able to represent a particular facial expression from a range of expressions (e.g., expressions included in one or more poses of the subject's performance). Animation model 108 can use the resulting shape geometries to define facial features of a computer-generated representation of the subject's face to match the facial features of the subject during the performance.

Animation model 108 may also include adjustable controls that control the animation model 108. For example, the adjustable controls can define the geometries of the shapes of the animation model 108. In some examples, an adjustable control may control a group of shapes to achieve different expressions. The adjustable controls may be represented on a graphical interface by, for example, a slider, a dial, or some other control mechanism that allows manual adjustment of a control. As one example, a particular adjustable control may define a geometry for one or more shapes of the animation model 108 that control the subject's nose. For example, adjustment of a slider and/or a value for the control may cause the right side of the subject's nose to snarl more or less depending on the amount of the value. Other adjustable controls may control all or part of the subject's eyes, all or part of the subject's mouth, all or other portions of the subject's nose, or any other portion of the subject's face. The values for the adjustable controls represented by graphical elements may go from 0 to 1, from −1 to 1, or any other range of values. For example, a range of values may include 0 for a minimum amount and 1 for a maximum amount for a particular adjustable control. As another example, a range of values may include −1 for a maximum in one dimension or direction and a 1 for a maximum in another dimension or direction for a different adjustable control. For example, a −1 value for an adjustable control for a mouth may cause the mouth to frown by causing the corners of the mouth to go downward, whereas a +1 value for the same adjustable control may cause the mouth to smile by causing the corners of the mouth to go upward, and a 0 value for the control may represent a neutral position. One of ordinary skill in the art will appreciate that other control ranges may be used and that different control ranges may be used for different adjustable controls.

The adjustable controls (e.g., adjustable controls represented by graphical elements) control the animation model 108 to define the facial features of the computer-generated representation 110 of the subject's face. Thus, the adjustable controls can be set or otherwise "adjusted" to represent different facial expressions for the animation model. In some embodiments, the animation model 108 is highly redundant with a large number of adjustable controls for the subject's face. For example, in some particular instances more than 50 adjustable controls can be used to control facial features of an animation model. In other particular instances, more than 100 adjustable controls can be used to control facial features of an animation model. Further details and examples of adjustable controls are set forth in U.S. application Ser. No. 14/704,796 entitled "Determining Control Values of an Animation Model using Performance Capture" filed on May 5, 2015, and assigned to Lucasfilm Entertainment Company, Ltd., the assignee of the present application. The Ser. No. 14/704,796 application is hereby incorporated by reference in its entirety.

Figures 2, 3:
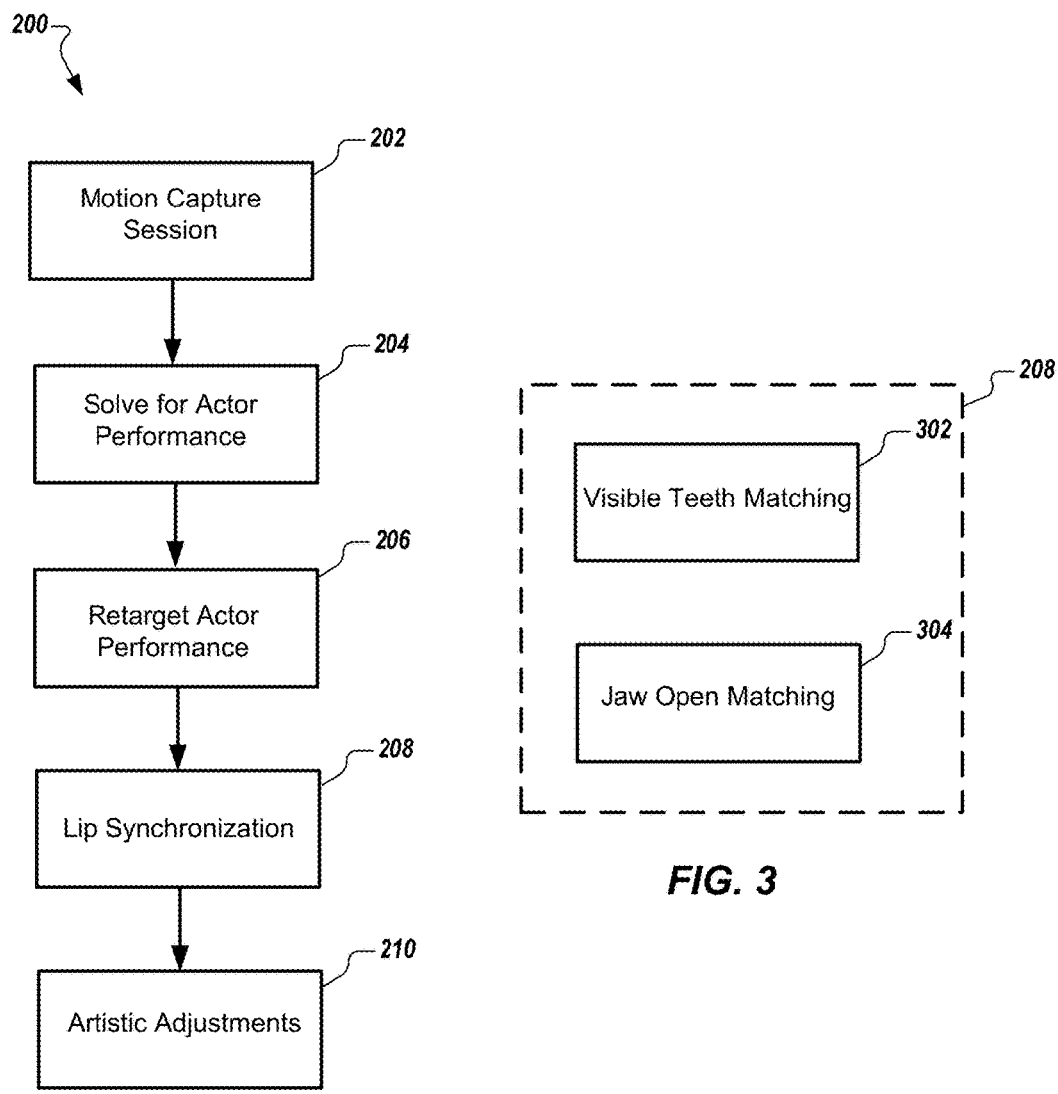
FIG. 2 is a flow diagram depicting a method according to some embodiments of the invention.
FIG. 3 illustrates the blocks performed in accordance with a lip synchronization process according to some embodiments of the invention.

Once created, the animation model 108 may be used in the process of transferring a facial expression from an actor to a CG character to recreate the facial expression of the actor onto a computer-generated representation 112 of the CG character as described with respect to FIG. 2, which is a flow diagram depicting a method according to an embodiment of the invention that can be implemented by computer system 102. To do, in some embodiments separate but parallel animation models are made to represent both the actor and the CG character. The animation models can be referred to as "rigs" with the animation model that represents the actor being referred to as the "actor rig" and the animation model that represents the animated character being referred to as the "creature rig". The parallel facial rigs are designed so that setting the same values for the same set of controls in each rig generates the same or, accounting for differences in geometries between the actor and creature rigs, similar facial poses on both rigs.

To transfer a facial expression from an actor to a CG character, computer system 102 may receive positional information from a motion capture session representing an actor's performance (FIG. 2, block 202) and, using a solver algorithm, solve the performance to determine how to drive the actor rig to match the actor's expressions from the performance (FIG. 2, block 204). According to one embodiment of the invention when solving for the performance, computer system 102 uses input data for each frame of an actor's performance as an input to an objective function to match the actor rig to the input data. In doing so, system 102 determines or solves for values for the adjustable controls of the actor rig, such that, for each frame of the performance, the facial expression of the actor rig represents the facial expression of the actor. The input data can be position information and/or contour information computed from the captured images of the subject during the performance. Once solved, the solution enables the actor rig to emulate the facial expressions of the actor during the performance.

In some embodiments, system 102 includes a solver module (not shown) that determines control values for one or more of the adjustable controls using the input data (e.g., the position information and/or contour information) computed from the captured images of the actor during a performance. In some instances the position information may be estimated from a captured image using one or more techniques for tracking the markers applied to the subject's face. For example, computer system 102 may execute a pattern tracking algorithm to track each marker 107 on the actor's face. Some markers are visible by one of the head-mounted cameras 104 or 106, and some of the markers are visible by both head-mounted cameras 104, 106. Computer system 102 can use markers captured by only one of cameras 104 or 106 to determine two-dimensional (2D) position information and can use markers captured by both of cameras 104 and 106 to determine three-dimensional (3D) position information. Once the position information of the input data is determined, the solver can match the two-dimensional points and three-dimensional points determined using the facial markers with corresponding positions or points on the actor rig using known techniques.

In addition to the position information determined from markers 107, the solver may also use contour information for facial features represented in the image as discussed above. For example, an outline of upper and lower lids of the actor's right eye or the outline of an actor's lower and/or upper lips. One or more techniques may be implemented for defining the contours represented in a given image. For example, the contours may be manually defined by an animator, editor, or other animation personnel, or may be automatically defined by one or more processes (e.g., executed by the computer system 102).

The solver can use the two-dimensional position information, the three-dimensional position information, and the contour information as input to determine control values for the adjustable controls of the actor rig that will replicate the pose or facial expression of the actor in the actor rig for each frame of the captured performance. The solver may further use one or more constraints when determining the control values for the adjustable controls of the actor rig. The constraints can operate to reduce the degrees of freedom that the solver has to consider when solving for the values of the adjustable controls. For example, a constraint to the solver may prevent the objective function from adjusting control values of certain adjustable controls, or may limit the objective function to accessing only certain adjustable controls, to constrain an amount by which a given adjustable control can be adjusted, or to place other limitations on the adjustable controls. Further details of a technique to solve for the performance are set forth in U.S. patent application Ser. No. 14/704,796 entitled "Determining Control Values of an Animation Model Using Performance Capture" incorporated by reference above.

Once system 102 solves the performance for the actor rig, computer system 102 can apply the same solution (set of controls and associated values of the controls that are applied to the actor rig to enable the actor rig to track the actor's facial features during a performance to provide closely-matched representations of the actor's facial poses or expressions) to the creature rig thereby transferring or "re-targeting" the actor's expression to the CG character (FIG. 2, block 206). Since the actor and creature rigs are designed so that setting the same values for the same set of controls generates the same or similar facial poses on both rigs, a general semantic parallelism is maintained between the rigs during the re-targeting process. Despite the significant efforts that may be made in developing the parallelism between the rigs to ensure matching semantic poses, it is difficult to have a perfect match between the source and target rigs and any mismatch may detract from transferring natural facial expressions from the actor to the CG character. In particular, rig mismatch on the lips has a significant impact when the dialog of a performance is transferred as the transferred lip animations may fail to match the dialog lines performed by the human actor.

To address mismatch between the actor's performance and the CG character, embodiments of the invention perform a lip synchronization process (FIG. 2, block 208) after the actor's expression is transferred to the CG character. The inventors have determined that the portion of a creature's teeth that are visible to viewers of an animation and the amount of the creature's jaw opening can be important in delivering proper visual enunciation of dialog from the creature. The lip synchronization process performs explicit perceptual lip matching between the animation of the actor rig and the creature rig by adjusting the lip shape of the creature face rig to perceptually match with the lip shape of the actor rig. The adjustments can be made by computer system 102 in an automated manner by adjusting values for one or more adjustable controls associated with the creature rig as described more fully below. After the lips are synchronized, artists can optionally make further adjustments to fine tune the creature rig by, for example, manually adjusting one or more of the adjustable controls used to control the creature rig using computer system 102 or another platform (FIG. 2, block 210) to complete the facial transfer process.

In one embodiment, lip synchronization process 208 includes a visible teeth matching block 302 along with a jaw open matching block 304 as shown in FIG. 3. In visible teeth matching block 302, the relative amount of visible teeth in the creature rig is matched to the relative amount of visible teeth in the actor rig. In jaw open matching block 304, the relative distance between the tips of the upper teeth and the tips of the lower teeth in the creature rig are matched to the relative distance between the tips of the upper teeth and the tips of the lower teeth in the actor rig. In other embodiments just one of visible teeth matching block 302 or jaw open matching block 304 are performed during lip synchronization process 208.

Figure 4:
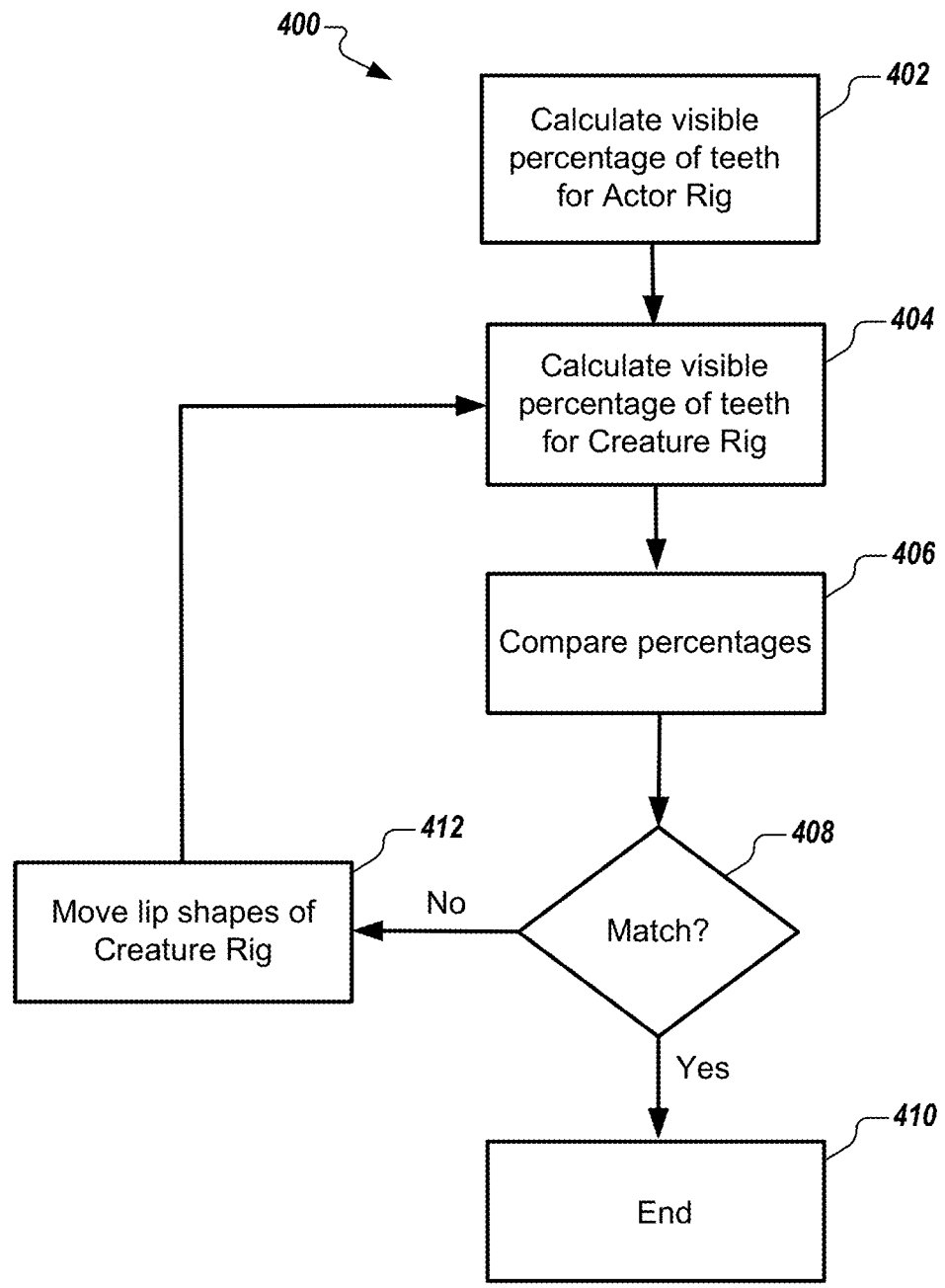
FIG. 4 is a flow diagram depicting a process for matching the relative amount of visible teeth in a creature rig to the relative amount of visible teeth in an actor rig according to some embodiments of the invention.

Reference is now made to FIG. 4, which is a flow chart depicting a process 400 for matching the relative amount of visible teeth in the creature rig to the relative amount of visible teeth in the actor rig according to an embodiment of the invention. Process 400 can be implemented as, for example, block 302 in FIG. 3. As shown in FIG. 4, for each frame processed, process 400 determines the visible percentage of teeth (e.g., both upper teeth and lower teeth) that are exposed at a particular location on both the actor rig (block 402) and the creature rig (block 404) and then compares the percentages (block 406) to determine if they match (block 408).

If the percentages of visible teeth match between the actor rig and creature rig, process 400 ends (block 410). If the percentages do not match, the relative amount of teeth showing in the creature rig (upper teeth or lower teeth depending on which is compared) is adjusted by moving the lips of the creature rig up or down to expose more or less of the teeth as necessary to move closer to a match (block 412). After the adjustment is made, process 400 determines a new visible percentage of teeth for the creature rig (block 404) and a new comparison to the actor rig is made (block 406). Process 400 continues repeating the sequence of blocks 404, 406, 408 and 412 until the relative percentages of the teeth being compared between the actor rig and the creature rig match (block 410). Rather than require an exact match or a match to a certain decimal place, in some embodiments, a match may occur when the relative amount of teeth exposed on the creature rig is within a predetermined range (e.g., 5% or 2%) of the relative amount of teeth exposed on the actor rig. The predetermined range can be set to a desired amount or accuracy level prior to implementing process 400, or the predetermined range can be set and/or changed by a user during process 400.

In some embodiments, there are multiple adjustable controls that control the position of the lips in the actor and creature rigs as described above. In one particular example, the position of the lips in the actor and creature rigs can be controlled by an adjustable upper lip raiser (e.g., a slider) that raises the upper lip and an adjustable lower lip depressor (e.g., another slider) that lowers the lower lip. Each of the upper lip raiser and lower lip depressor adjustable controls can be set according to a value between 0 to 1 where 0 is a neutral position (upper lip at its lowest possible position for the upper lip raiser, lower lip at its highest possible position for the lower lip depressor) and 1 is a maximum position (upper lip raised to its highest possible position for the upper lip raiser, lower lip lowered to its lowest possible position for the lower lip depressor). In some embodiments, block 412 moves the upper and lower lips by changing the values of the upper and lower lip controls, respectively. In still other embodiments, the relative position of the upper and lower lips with respect to the amount of teeth visible on a particular rig can be controlled, or at least partially controlled, by one or more additional adjustable controls instead of or in addition to the upper and lower lip adjustable controls.

In some embodiments, the lips of the creature rig can be adjusted in block 412 by moving either or both the upper and lower lip adjustable controls according to a binary search algorithm. For example, consider a frame in which block 206 sets the upper lip raiser control of the creature rig at 0.4 (on a scale of 0 to 1). If block 408 determines that the visible percentage of upper teeth on the actor rig is 80 percent in the given frame and determines that the visible percentage of upper teeth in the creature rig is only 50 percent, the upper lip raiser of the creature rig can be adjusted to raise the upper lip and expose a greater percentage of the upper teeth of the creature rig. As a first step of the binary search algorithm, the value of the upper lip raiser control can be increased to midpoint between its current value (0.4) and its maximum value (1) in block. Thus, block 412 can increase the value of the upper lip raiser from 0.4 to 0.7 after which process 400 returns to block 404 to determine the percentage of visible upper teeth in the creature rig after the adjustment. For this example assume the adjustment increased the percentage from 50% to 70% and assume that block 408 determines that a match exists when the percentage difference between the actor rig and creature rig is 5% or less. Block 406 will compare the percentages and, since they are still not within 5% of each other (70% versus 80%), block 408 determines that no match exists and the process moves to block 412 where the upper lip raiser control is adjusted in a second step of the binary search algorithm from 0.7 to 0.85 (halfway between the current 0.7 value and 1.0 the maximum value). For this second adjustment, assume the adjustment increased the percentage of visible upper teeth from 70% to 83% (block 404), which is within the 5% predetermined amount of the 80% value of the actor rig (block 406). Thus, block 408 will determine that a match exists and process 400 will be completed for the upper teeth and a similar sequence of events can be undertaken to match the relative amount of lower teeth exposed on the creature rig to the the relative amount of lower teeth exposed on the actor rig.

In some embodiments process 400 is performed for both the upper and lower teeth of the actor and creature rigs. In some instances, process 400 can first be performed for the upper teeth such that the upper teeth of the creature rig are matched to the upper teeth of the actor rig, and subsequently performed for the lower teeth such that the lower teeth of the creature rig are matched to the lower teeth of the actor rig. In other instances, process 400 can first be performed for the lower teeth and subsequently performed for the upper teeth. In other instances, adjustments to the visible percentages of upper and lower teeth of a creature rig in process 400 can be performed concurrently. For example, block 402 may calculate the visible percentage of both upper and lower teeth in the actor rig prior to block 404 being performed. The order in which blocks 402 and 404 are performed in process 400 can vary in different embodiments. For example, in some embodiments block 402 can be performed prior to block 404, while in other embodiments block 404 can be performed prior to block 402, and in still other embodiments the two blocks can be performed concurrently.

Figure 5:
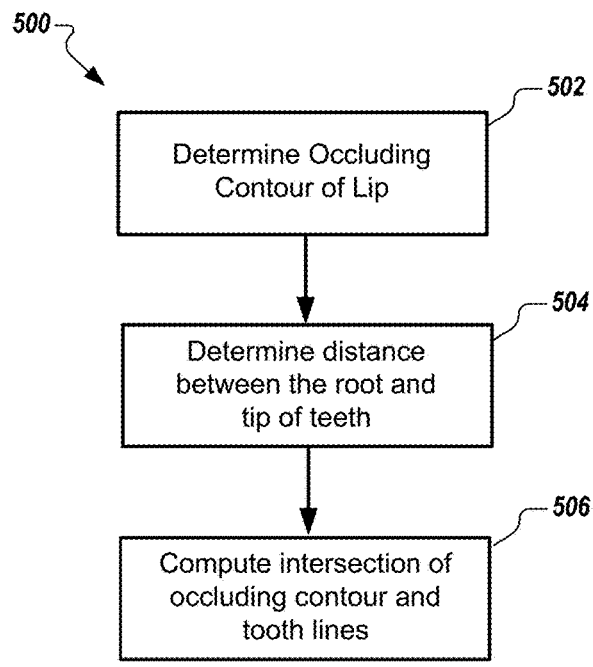
FIG. 5 is a flow diagram depicting a process for determining the relative amount of visible teeth in a rig, such as an actor rig or a creature rig, according to some embodiments of the invention.

A variety of different techniques can be used to determine relative percentages of visible teeth in blocks 402 and 404. One particular technique is described below with respect to FIG. 5 and FIGS. 6A and 6B. FIG. 5 is a flowchart depicting a process 500 for determining the relative amount of visible teeth in a computer-generated representation of an actor or creature, such as representation 600, which is partially shown in FIG. 6A. Representation 600 includes an upper lip 602 and a lower lip 604 and can be representative, for example, of either an actor rig or a creature rig. Process 500 can be used to determine both the relative amount of visible upper teeth and the relative amount of visible lower teeth on representation 600 and thus can be used to determine the relative amount of visible upper teeth and lower teeth of each of the actor rig (block 402) and creature rig (block 404).

Figure 6A:
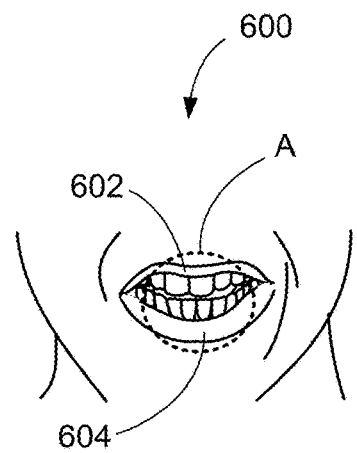
FIG. 6A is a simplified representation of a computer-generated character, such as an actor rig or a creature rig.

As shown in FIG. 5, block 502 determines the occluding contour of the upper and lower lips. That is, block 502 determines where the lip line (the lower portion of the upper lip or the upper portion of the lower lip) obstructs a view of the rig's teeth. For example, FIG. 6B, which is a simplified but expanded view of the portion of representation 600 within the dotted line shown in FIG. 6A, shows an occluding contour 612 of upper lip 602 and an occluding contour 614 of lower lip 604.

Figure 6B:
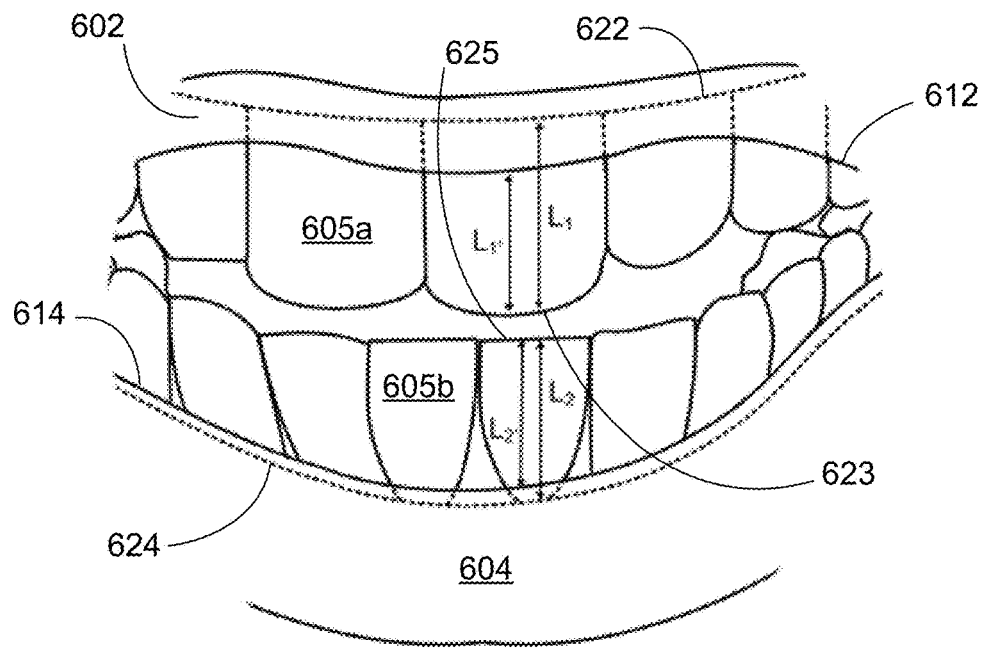
FIG. 6B is a simplified, expanded view of a portion within dotted line A of the simplified representation of a computer-generated character shown in FIG. 6A.

Referring back to FIG. 5, block 504 then determines the distance between the root and the tip for both the upper and lower teeth. For example, as shown in FIG. 6B, block 504 will determine the length, $L_1$, between a root 622 of the upper teeth 605a and a tip 623 of the upper teeth. Block 504 will also determine the length, $L_2$, between a root 624 of lower teeth 605b and a tip 625 of the lower teeth.

Block 506 determines the intersection of occluding contours 612 and 614 and the upper and lower teeth, respectively, on the projected plane through the camera. The intersection information represents the visible percentages of the upper teeth and lower teeth, respectively. For the upper teeth, the distance between the intersection of occluding contour 612 and tip 623 is shown in FIG. 6B as $L_{1'}$. The visible percentage of the upper teeth is thus represented by the formula: $L_{1'}/L_1$. Similarly, for the lower teeth, the distance between the intersection of occluding contour 614 and tip 625 is shown in FIG. 6B as $L_{2'}$, and the visible percentage of the lower teeth is thus represented by the formula: $L_{2'}/L_2$.

While the description of FIG. 5 above includes carrying out each of blocks 502, 504 and 506 sequentially on both the upper and lower lip portions of a rig prior to proceeding to the next block, embodiments of the invention are not limited to any particular order of these blocks. Additionally, the individual steps of process 500 can be carried out on the upper lip and lower lip separately. For example, each of blocks 502, 504 and 506 can be first carried out with respect to the upper lip of an actor rig and creature rig and then carried out with respect to the lower lip. In other embodiments, process 500 can be implemented on the lower lip first and then the upper lip. Furthermore, process 500 can be carried out on the actor rig prior to the creature rig, can be carried out on the creature rig prior to the actor rig or can be carried out on both the actor rig and creature rig concurrently.

Figure 7:
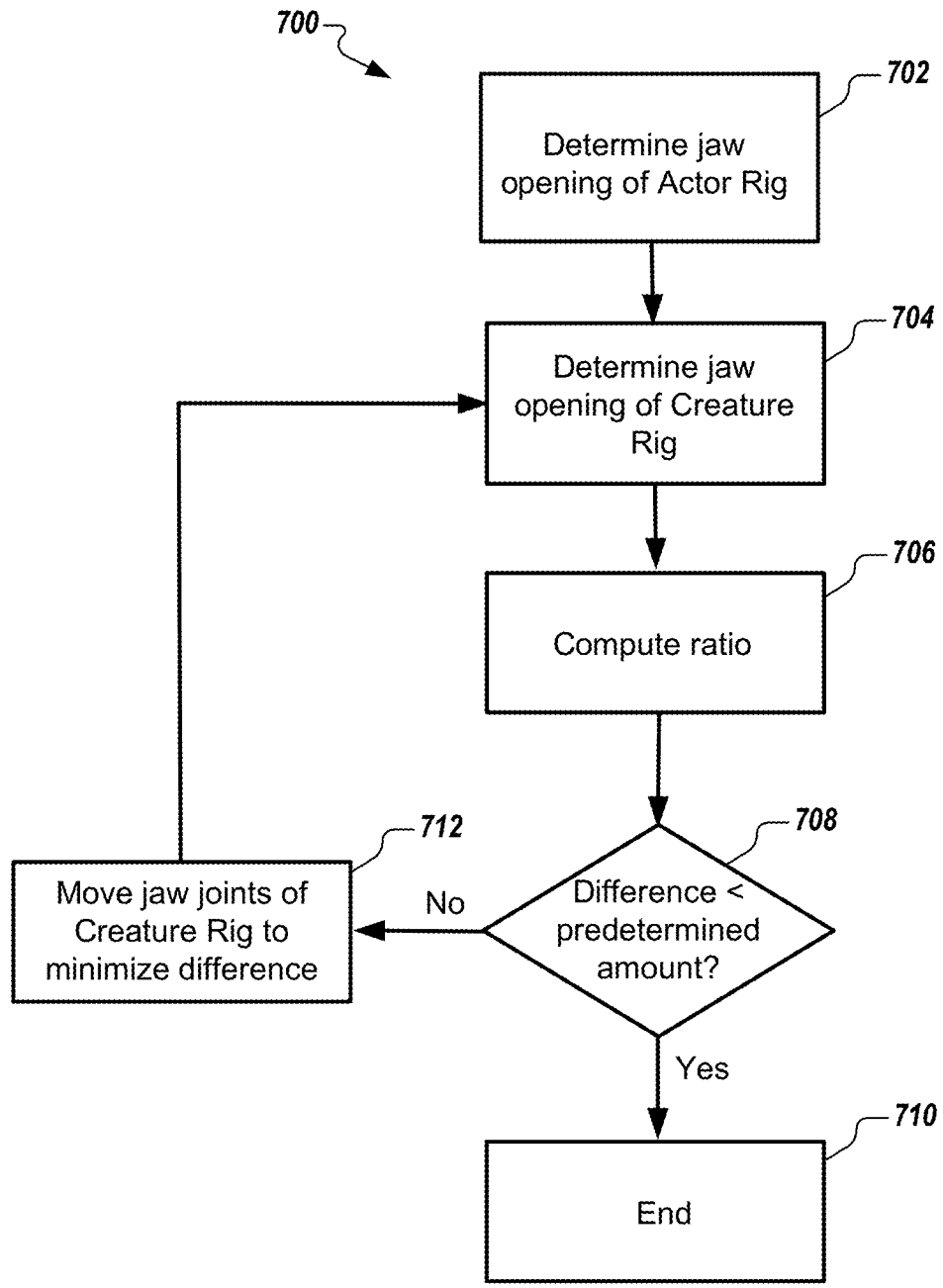
FIG. 7 is a simplified flow diagram depicting a process for matching the jaw opening in a creature rig to the jaw opening in an actor rig according to some embodiments of the invention.

Reference is now made to FIG. 7, which is a flow diagram depicting a process 700 for matching the jaw opening in the creature rig to the jaw opening in the actor rig according to an embodiment of the invention. Process 700 can be implemented as, for example, block 304 in FIG. 3. As shown in FIG. 7, for each frame processed, process 700 determines how much the jaw is open on both the actor rig (block 702) and the creature rig (block 704) and then compares the two openings (block 706) to determine if they match (block 708).

If the jaw openings match between the actor and creature rig, process 700 ends (block 710). If the jaw openings do not match (e.g., they differ by more than a predetermined amount), the jaw joints on the creature rig are adjusted to reduce the difference between the creature rig's jaw opening and the actor rig's jaw opening (block 712) and a new comparison is made starting with determining the amount that the jaw on the creature rig, as adjusted, is open (block 704). Process 700 continues repeating the sequence of blocks 704, 706, 708 and 712 until jaw opening of the creature rig is within a predetermined amount of the jaw opening of the actor rig (block 710). In some embodiments, a match may occur when the jaw opening of the creature rig is within a predetermined percentage (e.g., within 5% or within 2%) or within a predetermined range (e.g., within 2 mm or within 0.5 mm) of the jaw opening on the actor rig. The predetermined percentage or range can be set to a desired amount or accuracy level prior to implementing process 700, or the predetermined percentage or range can be set and/or changed by a user during process 700.

In some embodiments, there is one or more adjustable controls that control the opening of the jaws for the actor and creature rigs. In one particular example, the amount the jaw of a rig is open can be controlled by a jaw opening control (e.g., a slider) that raises and lowers the lower jaw since the upper jaw is fixed to the rig's skull. The jaw opening adjustable control can be set according to a value of 0 to 1 where 0 represents the jaw being closed and 1 represents the jaw being open to its maximum extent. In some embodiments, block 712 increases or decreases the opening of the creature rig jaw by changing the value of jaw opening adjustable control. In still other embodiments, the opening of the jaw can be controlled, or at least partially controlled, by one or more additional adjustable controls instead of or in addition to the jaw opening adjustable control.

In some embodiments, the jaw opening of the creature rig can be adjusted in block 712 by moving the jaw opening adjustable control according to a binary search algorithm similar to the binary search algorithm discussed above with respect to FIG. 4. For example, consider a frame in which block 206 sets the jaw opening adjustable control of the creature rig at 0.6 (on a scale of 0 to 1). If block 708 determines that the jaw opening on the actor rig is at 0.20 (a number different than the 0 to 1 scale of the adjustable slider) and determines that the jaw opening of the creature rig is at a value of 0.28 (also different than the 0 to 1 scale of the adjustable slider), the jaw opening adjustable control of the creature rig can be adjusted to close the jaw opening of the creature rig. As a first step of the binary search algorithm, the value of the jaw opening control can be decreased to the midpoint between its current value (0.6) and its minimum value (0) in block 712. Thus, block 712 can decrease the value of the jaw opening control from 0.6 to 0.3 after which process 700 returns to block 704 to determine the amount the jaw of the creature rig is open after the adjustment. For this example assume the new jaw open value has decreased 0.28 to 0.16 and assume that block 408 determines that a match exists when the percentage difference between the jaw opening of the actor rig and creature rig is 10% or less. Block 706 will compare the jaw openings and, since the difference is greater than 10% (0.16 creature rig versus 0.2 for the actor rig), block 408 determines that no match exists. Since block 704 determined that the adjusted jaw opening was now less than the jaw opening of the actor rig, in block 712 the jaw opening control is adjusted in a second step of the binary search algorithm to increase the opening of the jaw from a control value of 0.3 to 0.45 (halfway between 0.3 and 0.6, the initial value). For this second adjustment, assume the new jaw opening value is 0.21 (block 704), which within the 10% predetermined range for a match (block 706). Thus, block 708 will determine that a match exists and process 700 will be complete.

While FIG. 7 depicts block 702 occurring prior to block 704, the order in which these two blocks is performed in process 700 is not important. In some embodiments process 700 can perform block 702 prior to block 704, in some embodiments process 700 can perform block 704 prior to block 702, and in some embodiments process 700 can perform blocks 702 and 704 concurrently. Generally, whenever block 712 adjusts the jaw opening of the creature rig, process 700 will re-calculate the jaw opening of the creature rig (block 704) but does not need to recalculate the jaw opening of the actor rig (block 702) as the jaw opening of the actor rig is not changed by block 712.

Figure 8:
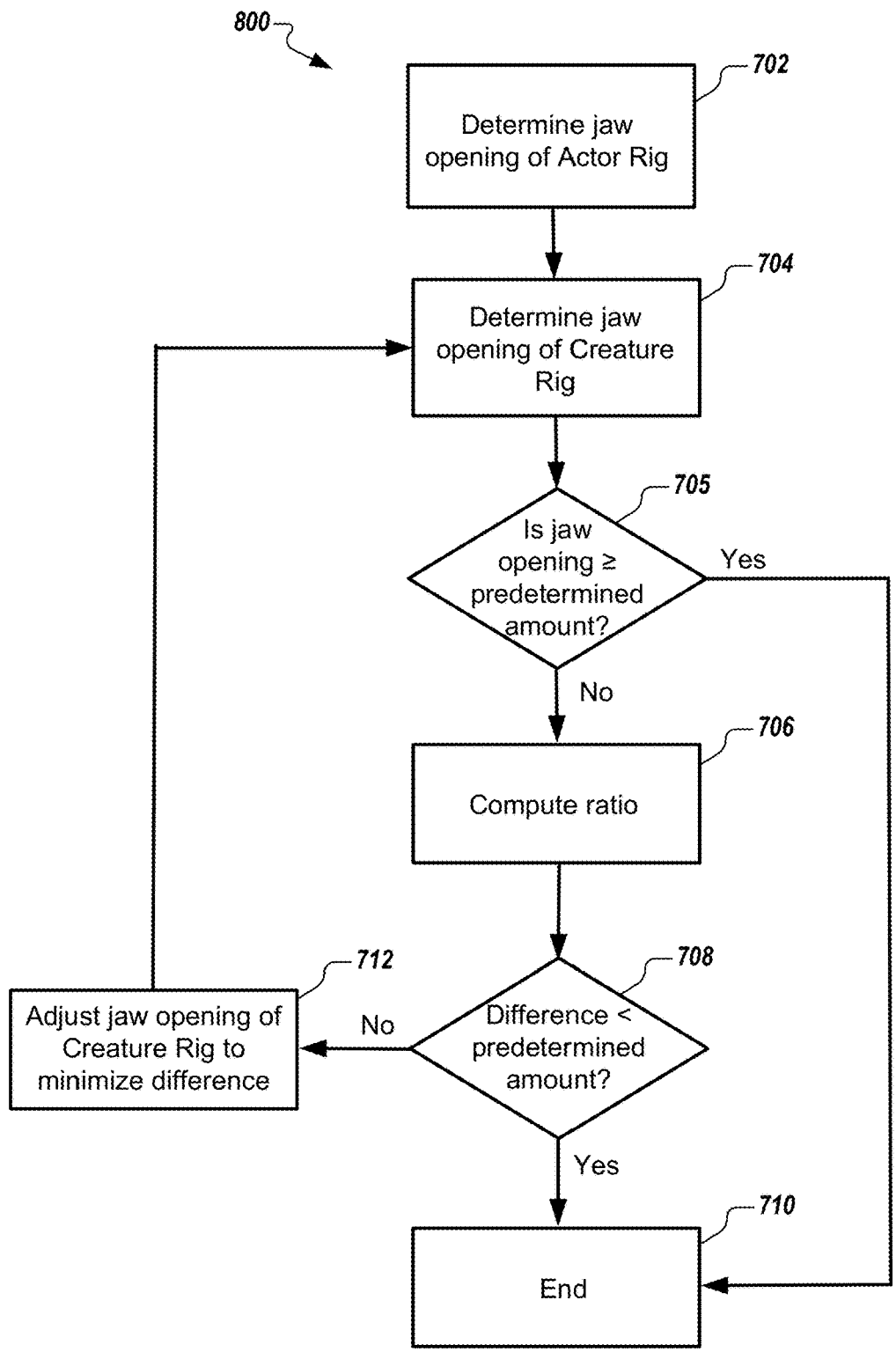
FIG. 8 is a flow diagram depicting a process for matching the jaw opening in the creature rig to the jaw opening in an actor rig according to other embodiments of the invention.

The inventors have determined that when the creature rig's jaw is open close to its full extent, the opening does not need to be adjusted in some instances in order for the jaw movements of the creature rig to reflect a realistic animation of the creature. Thus, some embodiments of the invention only adjust the jaw opening of the creature rig if the jaw opening of the creature rig is less than a predetermined amount. FIG. 8 is a flow diagram depicting a process 800 for matching the jaw opening in the creature rig to the jaw opening in the actor rig according to such an embodiment. In some instances process 800 is to process 700 discussed with respect to FIG. 7 except that process 800 includes an additional block 705 that can be executed after block 704 and prior to block 706. In block 705, the jaw opening of the creature rig is compared to a predetermined value that can be set by an artist or other user. If the jaw opening of the creature rig is greater than or equal to the predetermined value, process 800 determines that the jaw opening of the creature rig does not need to be adjusted and process 800 ends (block 710). If the jaw opening of the creature rig is less than the predetermined amount, process 800 proceeds in the same manner as process 700 described above. Since block 702 is not always necessary in process 800, in some embodiments, block 702 is only performed if block 705 determines that the jaw opening of the creature rig is less than the predetermined amount in which case block 702 can be performed between block 705 and block 706.

Figure 9:
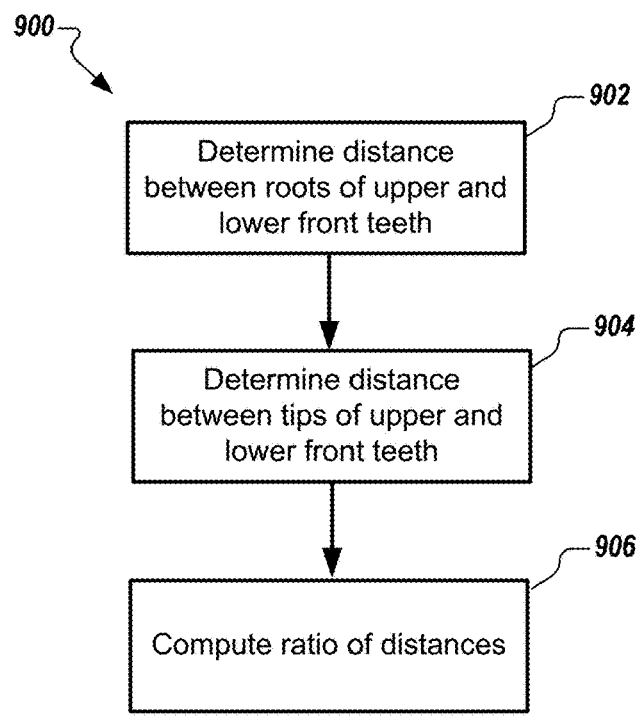
FIG. 9 is a flow diagram depicting a process for determining the jaw opening in a rig, such as an actor rig or a creature rig, according to some embodiments of the invention.
Figure 10:
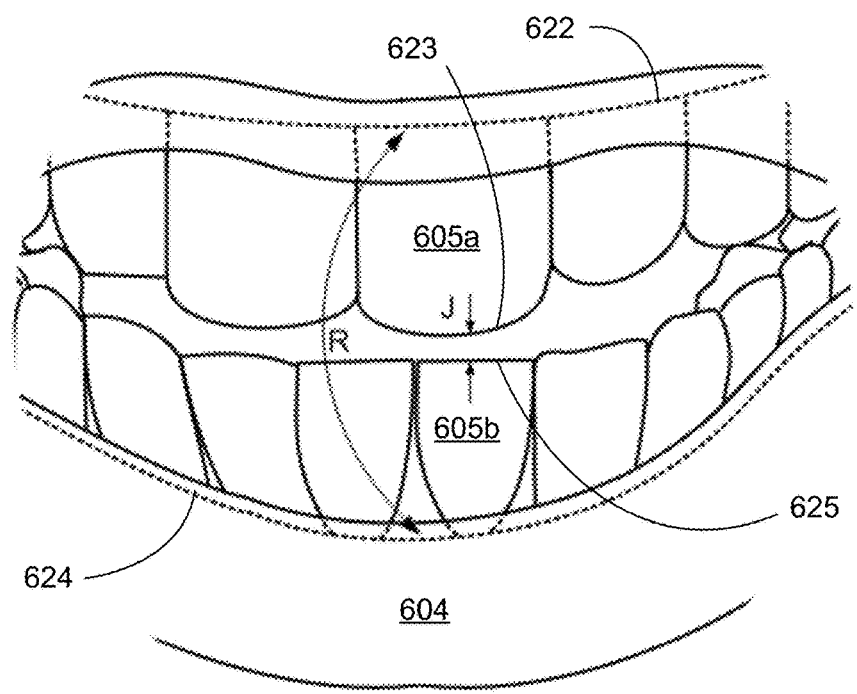
FIG. 10 is a simplified, expanded view of the portion within dotted line A of the simplified computer-generated representation shown in FIG. 6A.

A variety of different techniques can be used to determine the amount that the jaw is open in a particular rig, whether an actor rig or a creature rig, in blocks 702 and 704. One particular technique is described below with respect to FIG. 9, which is a flow diagram depicting a process 900 for determining the jaw opening in a rig, such as representation 600 shown in FIG. 6A, and FIG. 10, which is a simplified, expanded view of the portion of representation 600 within the dotted line shown in FIG. 6A. As shown in FIG. 9, block 902 determines the distance between the roots of the upper and lower front teeth. For example, referring to FIG. 10, block 902 determines the distance, R, between the root line 622 of the upper teeth and the root line 624 of the lower teeth. Block 904 determines the distance between the tips of the upper and lower teeth, which as shown in FIG. 10 as distance J and represents the distance between tip 623 of the upper teeth and top 625 of the lower teeth.

Block 906 then determines the ratio between J and R, which represents the amount that the jaw of representation 600 is open.

While FIG. 9 depicts block 902 as occurring prior to block 904, the order in which the distance between the roots (block 902) and the distance between the tips of the teeth (block 904) occurs can be reversed. Also, process 900 is typically carried out on both the actor rig (block 702) and the creature rig (block 704) and those two blocks can be implemented in any order or can be implemented concurrently.

Referring back to FIGS. 2 and 3, embodiments of the invention are not limited to any particular order of carrying out visible teeth matching block 302 and jaw opening block 304 when implementing lip synchronization block 208. Moving the jaw of a creature rig by opening or closing the jaw will often also result in movement of the lower lips, however. Thus, in some embodiments, lip synchronization block 208 will perform jaw open matching block 304 prior to visible teeth matching block 302. In this manner any movement of the lower lip by jaw open matching block will be accounted for when visible teeth matching block 302 determines if the percentage of teeth visible in the creature rig matches the percentage of visible teeth of the actor rig. In other embodiments, however, visible teeth matching block 302 can be performed prior to jaw opening block 304, and in still other embodiments of the invention, only one of visible teeth matching block 302 or jaw opening block 304 may be performed as the lip synchronization process and/or other additional actions may be performed as well.

Figure 11:
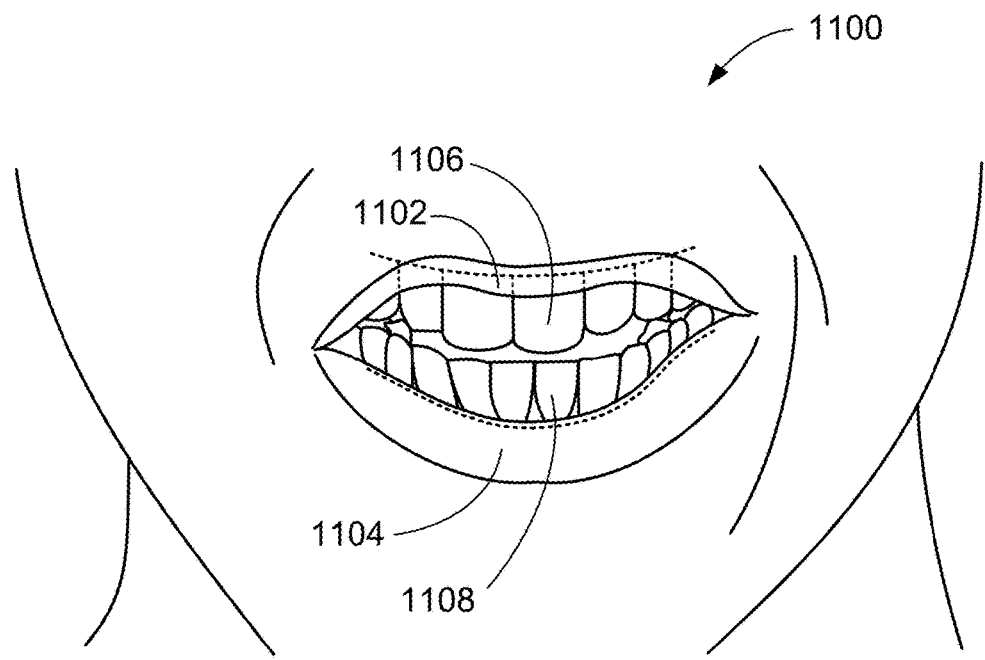
FIG. 11 is a simplified representation of an actor rig in which the facial expression of the rig was determined according to block 204 in FIG. 2 to match the facial expression of the actor at a given frame of a performance.
Figure 12:
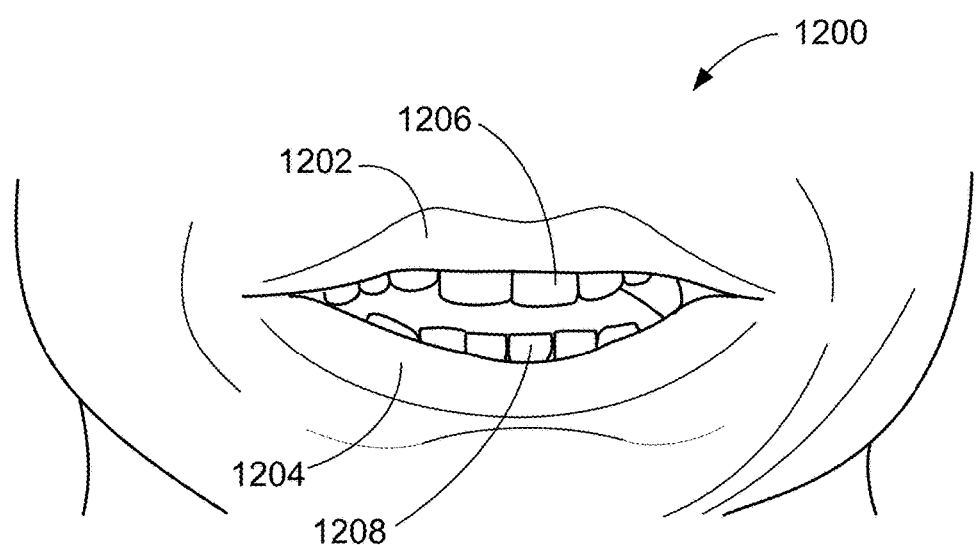
FIG. 12 is a simplified representation of a creature rig having a facial expression determined by retargeting the facial expression of the actor rig shown in FIG. 11 according to block 206 in FIG. 2.

To get a better understanding of how lip synchronization block 208 may impact the facial expression of a rig, reference is now made to FIGS. 11-15. FIG. 11 is a simplified illustration of an actor rig 1100 based on a particular frame as captured during a motion capture session, such as described with respect to FIG. 2, block 202. Actor rig 1100 includes upper and lower lips 1102 and 1104, respectfully, as well as upper teeth 1106 and lower teeth 1108. In FIG. 11, actor rig 1100 has been solved (FIG. 2, block 204) for the given frame while the actor performing the motion capture session was in the midst of a dialogue. FIG. 12 is a simplified illustration of a creature rig 1200 that includes upper and lower lips 1202 and 1204, respectfully, as well as upper teeth 1206 and lower teeth 1208. As shown in FIG. 12, the solution for the performance in the given frame applied to actor rig 1100 in FIG. 11 has been applied to creature rig 1200 (FIG. 2, block 206). Thus, the expression of the actor rig has been "re-targeted" from the actor rig to the creature rig.

As evident from a comparison between FIGS. 11 and 12, however, the re-targeting process resulted in a relatively small portion of each of the upper and lower teeth 1206 and 1208 of the creature rig being visible as compared to the portion of upper and lower teeth 1106 and 1108 of the actor rig. Additionally, the jaw of creature rig 1200 is also open considerably more than the jaw of actor rig 1100. Embodiments of the invention employ lip synchronization block 208 to improve upon this initial re-targeting.

Figure 13:
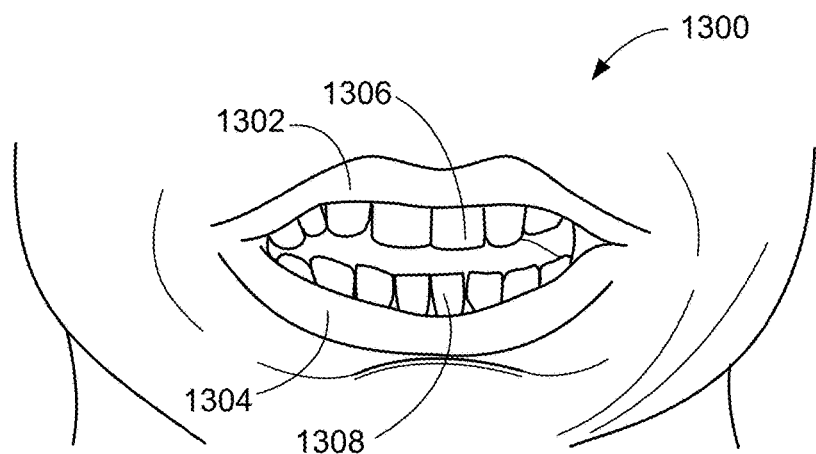
FIG. 13 is a simplified representation of a creature rig having a facial expression determined according to an embodiment of the invention.

For example, FIG. 13 is a simplified illustration of a creature rig 1300 that was initially re-targeted to actor rig 1100 in the same manner as creature rig 1200. Creature rig 1300, however, was also subject to a lip synchronization process (block 208) according to an embodiment of the invention in which visible teeth matching block 302 was performed without performing jaw open matching block 304. As shown in FIG. 13, more of upper and lower teeth 1306 and 1308 are visible in rig 1300 as compared to rig 1200 in FIG. 12. A visual comparison of FIGS. 11, 12 and 13 indicates that the lip and teeth positions of creature rig 1300 are a closer match to actor rig 1100 than creature rig 1200.

Figure 14:
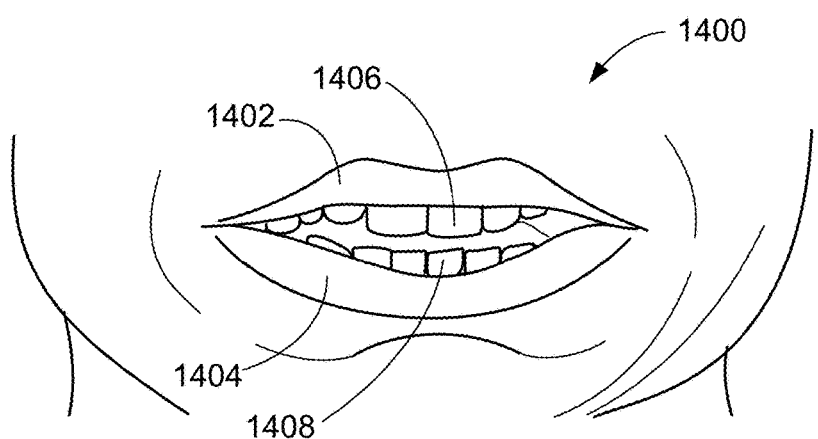
FIG. 14 is a simplified representation of a creature rig having a facial expression determined according to another embodiment of the invention.

As another example, FIG. 14 is a simplified illustration of a creature rig 1400 that was initially re-targeted to actor rig 1100 in the same manner as creature rig 1200. Creature rig 1400, however, was also subject to a lip synchronization process (block 208) according to an embodiment of the invention in which jaw open matching block 304 was performed without performing visible teeth matching block 302. As shown in FIG. 14, the jaw in rig 1400 (as represented by the distance between upper and lower teeth 1406 and 1408) is more closed than in rig 1200 of FIG. 12. A visual comparison of FIGS. 11, 12 and 14 indicates that the jaw position of creature rig 1400 is a closer match to that of actor rig 1100 than creature rig 1200.

Figure 15:
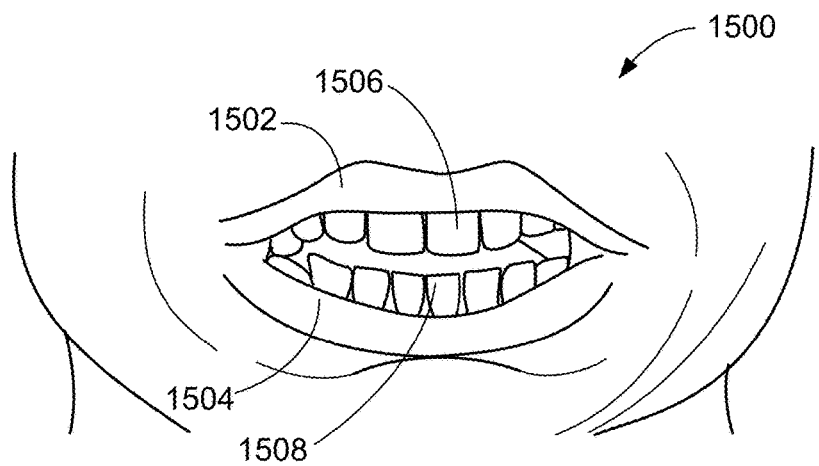
FIG. 15 is a simplified representation of a creature rig having a facial expression determined according to still another embodiment of the invention.

As still another example, FIG. 15 is a simplified illustration of a creature rig 1500 that was initially re-targeted to actor rig 1100 in the same manner as creature rig 1200, but was then also subject to a lip synchronization process (block 208) according to an embodiment of the invention in which both jaw open matching block 304 was performed followed visible teeth matching block 302. As shown in FIG. 15, more of upper and lower teeth 1506 and 1508 are visible in rig 1500 as compared to rig 1200 in FIG. 12. Also, the jaw in rig 1500 (as represented by the distance between upper and lower teeth 1506 and 1508) is more closed than in rig 1200. A visual comparison of FIGS. 11, 12 and 15 indicates that the lip and teeth positions of creature rig 1500 are a closer match to actor rig 1100 than creature rig 1200.

Figure 16:
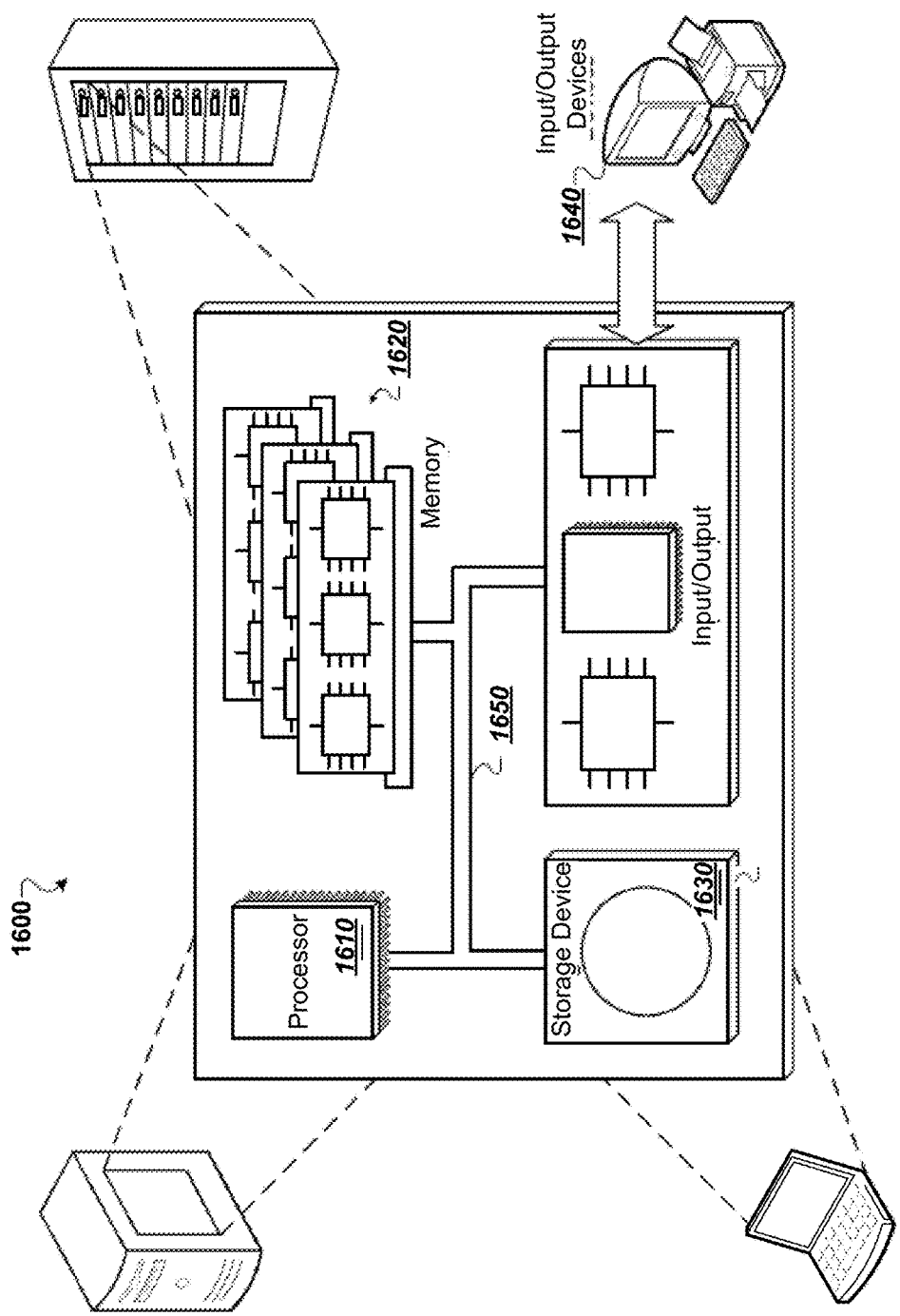
FIG. 16 is a simplified schematic diagram of an example of a computer system on which embodiments of the invention can be implemented.

Referring now to FIG. 16, a schematic diagram is shown of an example of a computer system 1600. The computer system 1600 is exemplary only and one having skill in the art will recognize that variations and modifications are possible. The system 1600 can be used for the operations described in association with the processes 200-500 of FIGS. 2-5, as well as any of the components shown in FIG. 1. For example, the components shown in FIG. 16 may be used at part of the computer 102 or the input sensor 104.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to perform the steps of processes according to the present invention.

The memory 1620 stores information within the system 1600 and may be associated with various characteristics and implementations. For example, the memory 1620 may include various types of computer-readable medium such as volatile memory, a non-volatile memory and other types of memory technology, individually or in combination.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard, pointing device, touchscreen display, and/or the like. In another implementation, the input/output device 1640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system 1600 can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. Also, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modification may be made without departing from the scope of the invention. Accordingly, other embodiments are within the scope of the following claims.

What is claimed is:

1. A method of transferring facial expressions from a subject to a computer-generated character, the method comprising:
receiving positional information from a motion capture session of the subject representing a performance having facial expressions to be transferred to the computer-generated character;
receiving a first animation model that represents the subject and a second animation model that represents the computer-generated character, each of the first and second animation models including a plurality of adjustable controls that define geometries of the model and that can be adjusted to present different facial expressions on the model, wherein setting the same values for corresponding sets of adjustable controls in the models generates a similar facial poses on the models;
determining a solution that matches the first animation model to the positional information to reproduce the facial expressions from the performance to the first animation model, the solution including values for at least some of the plurality of adjustable controls;
retargeting the facial expressions from the performance to the second animation model using the solution; and
thereafter, synchronizing lip movement of the second animation model with lip movement from the first animation model.

2. The method of transferring facial expressions from a subject to a computer-generated character set forth in claim 1 wherein synchronizing lip movement of the second animation model with lip movement from the first animation model comprises:
determining a visible percentage of teeth for the first animation model;
determining a visible percentage of teeth for the second animation model; and
determining if the visible percentage of teeth for the second animation model matches the visible percentage of teeth for the first animation model, and if not, adjusting the visible percentage of teeth in the second animation model to more closely match the percentage in the first animation model.

3. The method of transferring facial expressions from a subject to a computer-generated character set forth in claim 2 wherein adjusting the visible percentage of teeth in the second animation model to more closely match the percentage in the first animation model includes moving either or both upper and lower lip shapes of the second animation model.

4. The method of transferring facial expressions from a subject to a computer-generated character set forth in claim 3 wherein a match between the visible percentage of teeth for the second animation model and the visible percentage of teeth for the first animation model occurs when the percentages are within a predetermined amount of each other.

5. The method of transferring facial expressions from a subject to a computer-generated character set forth in claim 3 wherein the lip shapes are moved according to a binary search algorithm, and wherein the method further comprises repeating a sequence of: (i) determining a visible percentage of teeth for the second animation model, and (ii) determining if the visible percentage of teeth for the second animation model matches the visible percentage of teeth for the first animation model, and if not, adjusting the visible percentage of teeth in the second animation model to more closely match the percentage in the first animation model until the visible percentages match.

6. The method of transferring facial expressions from a subject to a computer-generated character set forth in claim 3 wherein:
    determining a visible percentage of teeth for the first animation model includes: (i) determining an occluding contour of both the upper or lower lips of the first animation model, (ii) determining a distance between a root and a tip for each of the upper and lower teeth of the first animation model, (iii) computing an intersection between the occluding contour and the tooth lines of the upper and lower teeth of the first animation model, and (iv) calculating a percentage of visible upper teeth and a percentage of visible lower teeth for the first animation model; and
    determining a visible percentage of teeth for the second animation model includes: (i) determining an occluding contour of both the upper or lower lips of the second animation model, (ii) determining a distance between a root and a tip for each of the upper and lower teeth of the second animation model, (iii) computing an intersection between the occluding contour and the tooth lines of the upper and lower teeth of the second animation model, and (iv) calculating a percentage of visible upper teeth and a percentage of visible lower teeth for the second animation model.

7. The method of transferring facial expressions from a subject to a computer-generated character set forth in claim 1 wherein synchronizing lip movement of the creature with lip movement from the first animation model comprises:
    determining a jaw opening of the first animation model;
    determining a jaw opening for the second animation model; and
    determining if the jaw opening of the second animation model matches the jaw opening of the first animation model, and if not, adjusting the jaw opening of the second animation model to more closely match the jaw opening of the first animation model.

8. The method of transferring facial expressions from a subject to a computer-generated character set forth in claim 7 wherein determining if the jaw opening of the second animation model matches the jaw opening of the first animation model is performed only if the jaw opening of the second animation model is less than a predetermined amount.

9. The method of transferring facial expressions from a subject to a computer-generated character set forth in claim 7 wherein determining a jaw opening for each of the actor and second animation models includes:
    determining a distance between roots of upper and lower teeth of the respective rig;
    determining a distance between tips of upper and lower teeth of the respective rig; and
    computing a ratio of the distance between the roots of the upper and lower teeth and the distance between the tips of the upper and lower teeth.

10. The method of transferring facial expressions from a subject to a computer-generated character set forth in claim 7 wherein adjusting the jaw opening of the second animation model to more closely match the jaw opening of the first animation model includes raising or lowering the lower jaw.

11. The method of transferring facial expressions from a subject to a computer-generated character set forth in claim 7 wherein the jaw opening is adjusted according to a binary search algorithm and wherein the method further comprises repeating a sequence of: (i) determining a jaw opening of the second animation model, and (ii) determining if the jaw opening of the second animation model matches the jaw opening of the first animation model, and if not, adjusting the jaw opening of the second animation model to more closely match the jaw opening of the first animation model until the jaw openings match.

12. The method of transferring facial expressions from a subject to a computer-generated character set forth in claim 7 wherein a match between the jaw opening of the second animation model and the jaw opening of the first animation model occurs when the openings are within a predetermined amount of each other.

13. The method of transferring facial expressions from a subject to a computer-generated character set forth in claim 1 wherein synchronizing lip movement of the creature with lip movement from the first animation model comprises:
    determining a jaw opening of the first animation model, determining a jaw opening for the second animation model, and determining if the jaw opening of the second animation model matches the jaw opening of the first animation model, and if not, adjusting the jaw opening of the second animation model to more closely match the jaw opening of the first animation model; and
    thereafter, determining a visible percentage of teeth for the first animation model, determining a visible percentage of teeth for the second animation model, and determining if the visible percentage of teeth for the second animation model matches the visible percentage of teeth for the first animation model, and if not, adjusting the visible percentage of teeth in the second animation model to more closely match the percentage in the first animation model.

14. The method of transferring facial expressions from a subject to a computer-generated character set forth in claim 1 wherein each of the first animation model and the second animation model comprise three-dimensional deformable numerical meshes and the adjustable controls for each animation model define geometries of its mesh.

15. The method of transferring facial expressions from a subject to a computer-generated character set forth in claim 14 wherein the first animation model mathematically defines the shape and motion of a computer-generated representation of the subject and the second animation model mathematically defines the shape and motion of a computer-generated representation of the computer-generated character.

16. A system for transferring facial expressions from a subject to a computer-generated character, the system comprising:
    a memory storing a plurality of instructions; and
    one or more processors configurable to:

receive positional information from a motion capture session of the subject representing a performance having facial expressions to be transferred to the computer-generated character;

receive a first animation model that represents the subject and a second animation model that represents the computer-generated character, each of the first and second animation models including a plurality of adjustable controls that define geometries of the model and that can be adjusted to present different facial expressions on the model, wherein setting the same values for corresponding sets of adjustable controls in the models generates similar facial poses on the models;

determine a solution that matches the first animation model to the positional information to reproduce the facial expressions from the performance to the first animation model, the solution including values for at least some of the plurality of adjustable controls;

retarget the facial expressions from the performance to the second animation model using the solution; and thereafter, synchronize lip movement of the second animation model with lip movement from the first animation model.

17. The system set forth in claim 16 wherein, when synchronizing lip movement of the second animation model with lip movement from the first animation model, the one or more processors are configurable to determine a jaw opening of the first animation model, determine a jaw opening for the second animation model, and determine if the jaw opening of the second animation model matches the jaw opening of the first animation model, and if not, adjust the jaw opening of the second animation model to more closely match the jaw opening of the first animation model.

18. The system set forth in claim 16 wherein when synchronizing lip movement of the second animation model with lip movement from the first animation model, the one or more processors are further configurable to determine a visible percentage of teeth for the first animation model, determine a visible percentage of teeth for the second animation model, and determine if the visible percentage of teeth for the second animation model matches the visible percentage of teeth for the first animation model, and if not, adjust the visible percentage of teeth in the second animation model to more closely match the percentage in the first animation model.

19. A computer-readable memory storing a plurality of instructions executable by one or more processors for transferring facial expressions from a subject to a computer-generated character, the plurality of instructions comprising:

instructions that cause the one or more processors to receive positional information from a motion capture session of the subject representing a performance having facial expressions to be transferred to the computer-generated character;

instructions that cause the one or more processors to receive a first animation model that represents the subject and a second animation model that represents the computer-generated character, each of the first and second animation models including a plurality of adjustable controls that define geometries of the animation model and that can be adjusted to represent different facial expressions on the model, wherein setting the same values for corresponding sets of adjustable controls in the models generates similar facial poses on the models;

instructions that cause the one or more processors to determine a solution that matches the animation model to the positional information to reproduce the facial expressions from the performance to an first animation model that represents the subject using the positional information and animation model, the solution including values for at least some of the plurality of controls;

instructions that cause the one or more processors to retarget the facial expressions from the performance to the second animation model using the solution; and instructions that cause the one or more processors to synchronize lip movement of the creature with lip movement from the first animation model after the facial expressions are retargeted from the performance to the second animation model.

20. The computer-readable memory of claim 19 wherein the instructions that cause the one or more processors to synchronize lip movement of the creature with lip movement from the first animation model after the facial expressions are retargeted from the performance to the second animation model comprise:

instructions that determine a jaw opening of the first animation model, determine a jaw opening for the second animation model, and determine if the jaw opening of the second animation model matches the jaw opening of the first animation model, and if not, adjust the jaw opening of the second animation model to more closely match the jaw opening of the first animation model; and instructions that, after adjusting the jaw opening of the second animation model, determine a visible percentage of teeth for the first animation model, determine a visible percentage of teeth for the second animation model, and determine if the visible percentage of teeth for the second animation model matches the visible percentage of teeth for the first animation model, and if not, adjust the visible percentage of teeth in the second animation model to more closely match the percentage in the first animation model.

* * * * *